United States Patent [19]
Wilson, Sr.

[11] Patent Number: 5,253,220
[45] Date of Patent: Oct. 12, 1993

[54] FISH FINDER

[76] Inventor: John E. Wilson, Sr., 809 Skyline Dr., Willis, Tex. 77378

[21] Appl. No.: 887,801

[22] Filed: May 26, 1992

[51] Int. Cl.$^5$ .............................................. G01S 15/96
[52] U.S. Cl. ...................................... 367/107; 43/17.1
[58] Field of Search ........................ 367/107, 113, 910; 43/18.1-21.25, 17.1-17.3

[56] References Cited

U.S. PATENT DOCUMENTS

| | | | |
|---|---|---|---|
| 2,680,925 | 6/1954 | Grunwald et al. | 43/25 |
| 2,700,787 | 2/1955 | Trapanese | 43/25 |
| 2,713,228 | 7/1955 | Grunwald | 43/25 |
| 3,020,666 | 2/1962 | Hull | 43/20 |
| 3,846,930 | 11/1974 | Brown | 43/25 |
| 4,995,009 | 2/1991 | Altmire et al. | 367/107 |
| 5,088,223 | 2/1992 | Chu | 43/17 |

*Primary Examiner*—Ian J. Lobo
*Attorney, Agent, or Firm*—Harrison & Egbert

[57] ABSTRACT

An improved apparatus and method for finding fish both onshore and offshore, and under a diversity of marine conditions is provided. A specially configured rod and reel combination enables the electrical communication between a sensor float disposed at the remote open end of the rod and a display unit releasably attached to the reel portion disposed opposite of the reel. A transducer is disposed vertically within a foam matrix positioned in a sensor float. Electrical signals are generated within a display unit and then transmitted to the transducer. These signals are conventionally converted into corresponding ultrasonic signals which are directed downward into the environing water. The ultrasonic signals travel until deterred by either fish, an unknown obstacle, or the bottom of the body of water. These signals are then echoed back to the transducer and converted into corresponding electrical signals, for transmission through the conductor cable to the display unit. The sensor float contains a diode on its top for easy viewing under marine conditions. Replaceable wiper means comprising a flexible member of conical cross section which axially receives said conductor cable is also provided.

9 Claims, 13 Drawing Sheets

FISH FINDER

BACKGROUND OF THE INVENTION

This invention relates to fishing, and more particularly relates to an apparatus and method for finding fish under a diversity of marine environments.

It is well known in the prior art that locator and finding devices may use sonic transducers to emit sound waves and detect reflections thereof. Such devices are generally described by Moshier, Van Lennep and Perry in U.S. Pat. No. 3,558,822. Similarly, Parker, in U.S. Pat. No. 3,289,465, discloses an ultrasonic leak locator consisting of a hand-held pole electrically interconnected with an external portable housing containing a transducer and earphones. The Parker device locates the source of ultrasonic vibrations caused by escaping gas through apertures in pressurized aerial cables.

This sound-echo locating methodology has been applied to depth finding in marine environments. For example, U.S. Pat. No. 4,225,952 discloses a depth sounding apparatus including a floating bomb-like housing which is cast away from and attached to a vessel by an umbilical cord. As another example, Morgan teaches a device for determining the range and bearing of small underwater objects in U.S. Pat. No. 2,935,728. The Morgan locator uses a piezoelectrical crystal in contact with a body of water which is excited by a frequency modulating oscillator, to produce supersonic reflected waves.

There have been improvements in the art teaching range or depth finding devices which consume minimal power and afford portability. For example, in U.S. Pat. No. 3,564,490, Camp discloses an electronic depth gauge which is typically used on a boat. The Camp depth finding device includes an oscillator to generate an ultrasonic signal which is transmitted into the water and a transducer to record the voltage of the corresponding reflected signal.

Similarly, Altmire, et al, in U.S. Pat. No. 4,995,009, teach a castable fish and depth finder which uses a specially adapted rod and reel in conjunction with an external display to ascertain the presence of fish in a particular body of water. The Altmire device, however, is limited to onshore uses and is intended for use only under environments devoid of weeds and debris. In addition, its bobber aspect has a support harness and stabilizers, both of which tend to become snagged or entangled under adverse, but not uncommon, marine conditions. Furthermore, since its display is disposed external of the rod-reel combination, external cabling is required and complete portability is lacking.

Thus, heretofore unknown in the prior art is a method and an apparatus for conveniently and portably finding and locating fish both onshore and offshore under even marine environments containing weeds, organic impurities and debris. The prior art also suffers from no finder device which inherently prevents conductor cable from being contaminated by excessive water, organic impurities or debris. Accordingly, these limitations and disadvantages of the prior art are overcome with the present invention, and improved means and techniques are provided which are especially useful for finding fish in a diversity of onshore and offshore marine environments.

SUMMARY OF THE INVENTION

The present invention provides an improved apparatus and method for finding fish both onshore and offshore, and under a diversity of marine conditions. A specially configured rod and reel combination enables the electrical communication between a sensor float disposed at the remote open end of the rod and a display unit releasably attached to the reel portion disposed opposite of the reel.

In accordance with the preferred embodiment of the present invention, a transducer is disposed vertically within a foam matrix positioned in the sensor float. Electrical signals are generated within the display unit and then transmitted to the transducer disposed in the sensor float. These signals are conventionally converted into corresponding ultrasonic signals which are directed downward into the environing water. As is well known by those skilled in the art, the ultrasonic signals travel until deterred by either fish, an unknown obstacle, or the bottom of the body of water. These signals are then echoed back to the transducer and converted into corresponding electrical signals, for transmission through the conductor cable to the display unit.

In accordance with the preferred embodiment of the present invention, the sensor float contains a diode on its top for easy viewing under marine conditions. In addition, to enable effective night fishing or fishing under poor lighting, the display unit may optionally be illuminated. In addition, wiper means comprising a flexible member of substantially conical cross section is configured to insertably and snuggly receive the conductor cable, thereby causing the removal of residual water, debris, and the like therefrom. The conical configuration is disposed relative to the rod such that during casting there is no inhibition to the travel of the cable, but during reeling the cable back onto the spool water and debris are stripped therefrom.

As should be appreciated by those skilled in the art, the present invention provides a portable and convenient method for finding fish.

It is the object of the present invention to provide an apparatus and method for finding fish both onshore and offshore, regardless of the environmental marine conditions.

It is an object and feature of the present invention that a method and apparatus are provided which enables fish to be found in marine environments not ordinarily accessible to fish-finding devices.

It is another object and feature of the present invention that fish may be effectively located and caught under poor lighting conditions or after nightfall.

It is yet another object and advantage of the present invention that an apparatus is provided having a wiper means with a flexible member of substantially conical cross section configured to insertably and snuggly receive conductor cable, thereby causing the removal of residual water, debris, and the like therefrom, but without interfering with the casting of such cable.

It is still another object of the present invention that an apparatus is provided with a wiper means which is easily replaceable and remains in place during use thereof.

It is a specific object of the present invention a handheld fish finder comprising: a rod portion; a handle portion; a reel portion medially interconnected with said rod portion and said handle portion; said reel portion adapted to receive display means and reel means having replaceable wiper means; said display means electrically connected with a power source and cable means; said cable means windably received at one end thereof by said reel means after being purged of debris and excessive water by said wiper means; said cable means when unwound from said reel means disposed longitudinally of said rod portion and another end of said cable means, opposite said one end thereof, insertably received by a remote free end of said rod portion by guide means fixedly attached to said rod portion; and sensor float means electrically connected to said other end of said cable means at said remote free end of said rod portion for transmitting a signal along said cable means to said display means.

It is another specific object of the present invention a hand-held fish finder comprising: a rod portion; a handle portion; a reel portion medially interconnected with said rod portion and said handle portion; said reel portion adapted to receive display means and open-ended reel means having replaceable wiper means; said wiper means comprising a flexible member configured to abuttably and insertably receive said cable means and configured with slit means for enabling replacement of said flexible member with said cable means being disposed therethrough; said display means electrically connected with a power source and cable means; said cable means windably received at one end thereof by said reel means after being purged of debris and excessive water by said wiper means; said cable means when unwound from said reel means disposed longitudinally of said rod portion and another end of said cable means, opposite said one end thereof, insertably received by a remote free end of said rod portion by guide means fixedly attached to said rod portion; and sensor float means electrically connected to said other end of said cable means at said remote free end of said rod portion for transmitting a signal along said cable means to said display means.

These and other objects and features of the present invention will become apparent from the following detailed description, wherein reference is made to the figures in the accompanying drawings.

DETAILED DESCRIPTION

Figure 1:
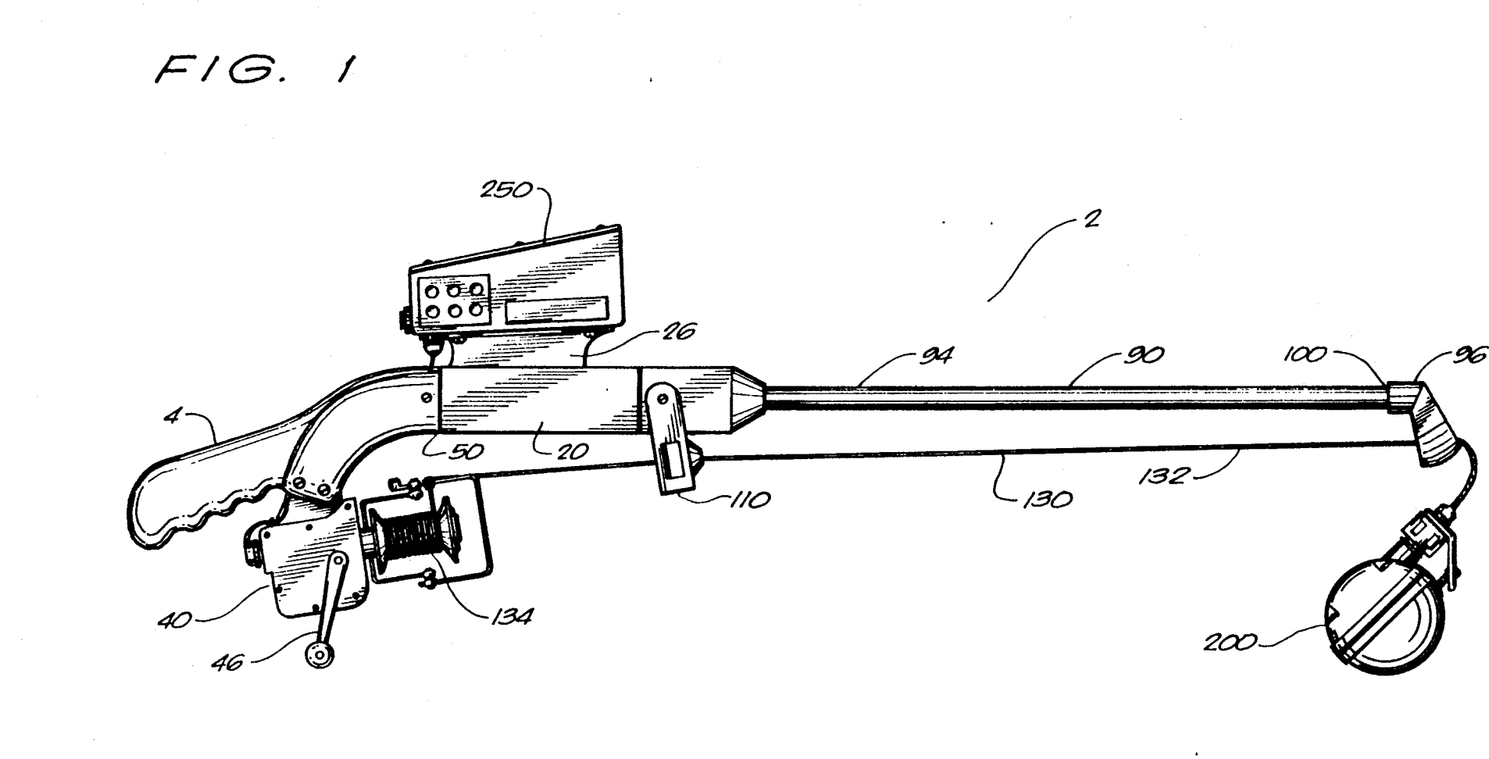
FIG. 1 depicts a side view of a fish finder embodying the present invention.

Now referring to FIG. 1, there is depicted a side view of fish finder 2 comprised of reel portion 20 which is disposed medially of handle portion 4 and rod portion 90. In particular, handle portion 4 abuts and is fixedly attached to reel portion 20. In accordance with the present invention, end 44 of reel portion 20 remote of handle portion 4 is conventionally releasably attached to reel portion 20 by a chuck or the like (not shown). End 50 of reel portion 20 is fixedly attached to handle portion 4.

Still referring to FIG. 1, there is seen preferably coaxial conductor cable 130 which electrically interconnects sensor float assembly 200 and display housing 250. Cable portion 134 of coaxial conductor cable 130 is wound around spool 52 of reel assembly 40, while cable portion 132 thereof is extended along rod portion 90 and inserted through grommet 96 disposed fixedly at remote free end 102 of rod portion 90. Wiper 110 is configured to be fixedly attached to reel portion 20 and abuttably receives conductor cable 130 therethrough as will be described in detail. In accordance with the present invention, wiper 110 prevents organic impurities and debris and excessive water contained on cable 130 from interfering with the normal operation of reel 42.

Figures 2, 2A, 3, 3A:
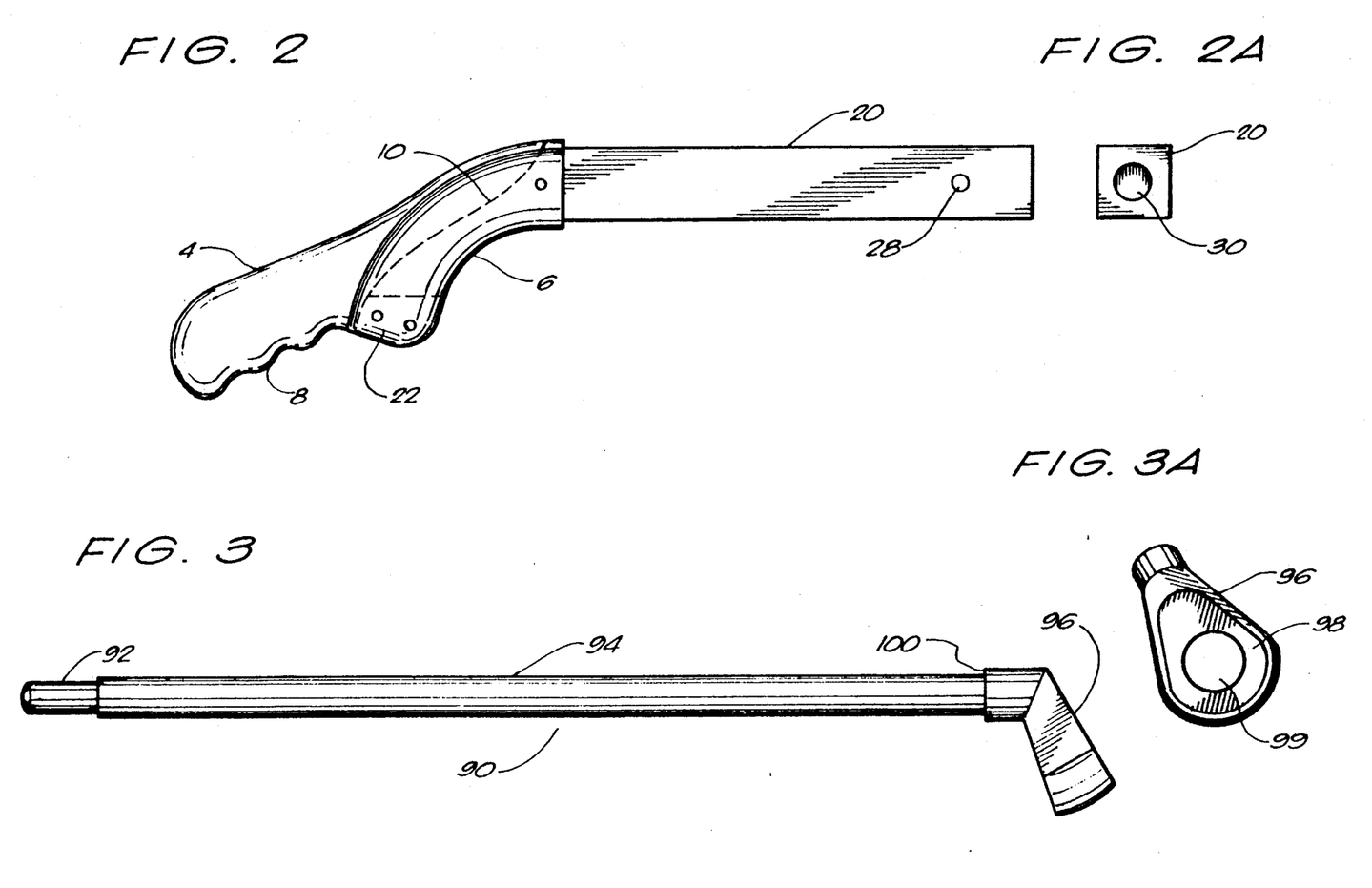
FIG. 2 depicts a simplified side view of the present invention depicted in FIG. 1, with the reel, display housing and conductor cable means removed.
FIG. 2A depicts a front edge view of the present invention depicted in FIG. 2.
FIG. 3 depicts a side view of the rod portion embodying the present invention.
FIG. 3A is a frontal edge enlarged view depicting a grommet embodying the present invention depicted in FIG. 3.

FIG. 2 depicts a simplified side view of handle portion 4 and adjacent reel portion 20 of fish finder 2, but with reel assembly 40, display housing 250 and cable 130 removed. Handle portion 4 preferably includes gripping surface 8 and grip handle cover 6. Handle cover 6 is abuttably received by handle portion 4 and is configured to cooperate with recess 10 which provides a channel to receive cable 60 for electrical interconnection with display housing 250 and sensor 200, as will be described hereinafter in detail. Recess 24 is configured to abuttably receive display housing 250 and secure it to reel portion 20 by bracket 26. Reel bracket 22 is disposed at the bottom of handle cover 6 and fixedly attached thereto. Also shown is hole 28 for receiving wiper 110.

Now referring to FIG. 2A depicting end view of reel portion 20 shown in FIG. 2 and FIG. 3 depicting a simplified side view of preferably square cross-section of rod portion 90, there is seen preferably cylindrical receptacle 104 configured to snugly receive projection pin 92 of rod portion 90, for releasably attaching rod portion 90 to reel portion 20. Also shown is grommet 96 disposed at the remote free end 102 rod portion 90. As depicted in the enlarged end view of grommet 96 in FIG. 3A, the grommet is preferably constructed with substantially annular Teflon layer 98 configured with aperture 99 for insertably receiving portion 132 of cable 130 and guiding it toward a target as the present invention is cast in a conventional manner. As is well known in the art, a material like Teflon minimizes abrasion and wear on the cable during casting and reeling operations.

Figure 4:
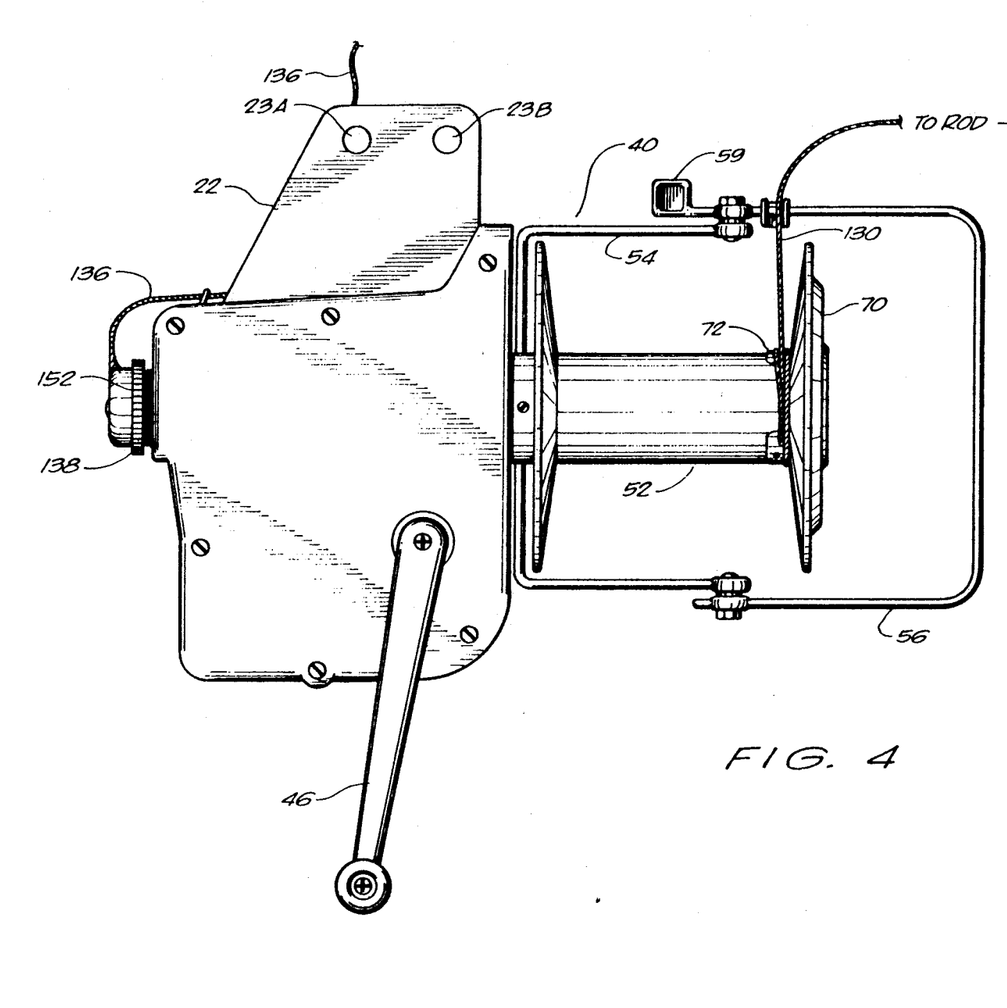
FIG. 4 is a front view depicting a reel assembly embodying the present invention.

In accordance with the preferred embodiment of the present invention, reel assembly 40 is specially designed to facilitate electrical communication between sensor float 200 and display housing 250 via cable 130 and short cable portions 136 and 146 interconnected with reel assembly 40 and display box 250 and sensor assembly 200, respectively. Referring now to FIG. 4, there is depicted a front view of reel assembly 40 depicted in FIG. 1. As is common in the art, reel assembly 40 is fixedly attached to reel portion 20 with reel bracket 22 by countersunk bolts 23A and B. Conductor cable 130 is received by recess or channel 10 (FIGS. 2 and 5) and retained by handle cover 6.

Reel 42 is preferably open-faced whereby spool 52 does not rotate to wind cable portion 134 therearound, but instead cable portion 134 is caused to be wound around spool 52 by the cooperation between spool winder arm 54 and spool winder guide 56. Still referring to FIG. 4 and also referring to FIG. 5, an axial cross-sectional view of the reel assembly depicted in FIG. 4, the relationship between reel 42, spool 52 and interconnecting cables are shown in detail. In accordance with the preferred embodiment of the present invention, spool 52 moves approximately ⅛ inch with each rotation of spool winder arm 54 caused by turning crank 46.

Figure 5:
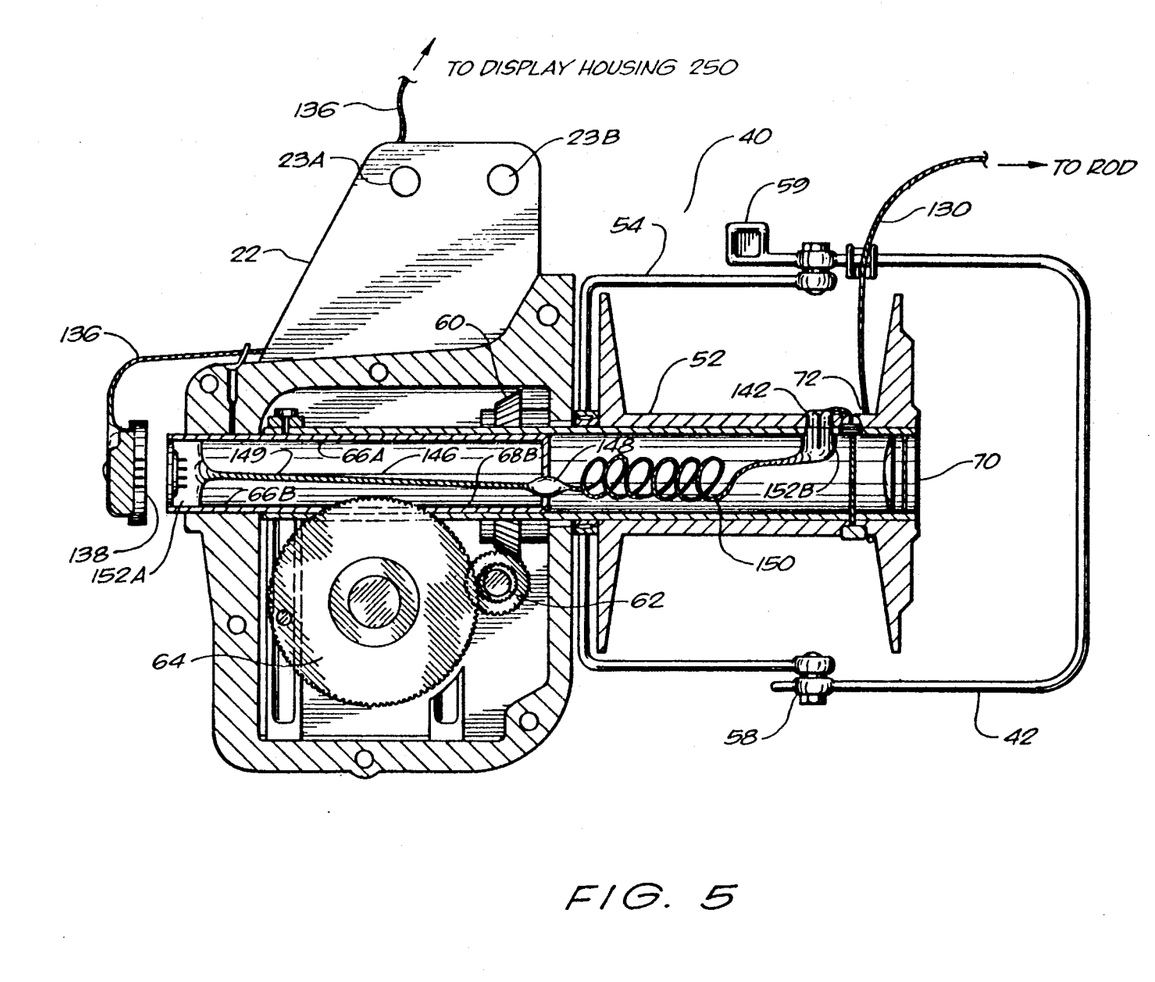
FIG. 5 is an axial cut-away view of the reel assembly depicted in FIG. 4.

More particularly, turning crank 46 drives eccentric gear 64 which engages pinion 62 which, in turn engages transfer gear 60. This cooperation then causes spool winder arm 54 to control the winding or unwinding of cable portion 134 around spool 52. As is well known to those familiar with the conventional operation of open-faced reels, spool winder arm guide 56 is positioned aside when casting to unwind cable 134 from spool 52. Similarly, spool winder arm guide 56 snaps in place to rewind cable portion 134 around spool 52. Thus, clockwise rotation of crank 46 of reel assembly 40 causes cable portion 134 to be unwound as extended cable portion 132. Similarly, counterclockwise rotation of crank 46 causes cable portion 132 to be wound around spool 52 as wound cable portion 134. It is an advantage and feature of the present invention that open-faced reel 42 does not rotate: cable portion 134 is wrapped around spool 52 which remains stationary. This, of course, avoids cable 134 becoming twisted thereby interfering with the normal casting operation, which can be a nuisance under adverse marine environments.

Now referring to FIG. 5, there is seen the electrical connections between conductor cables 134, 136, and 146. More particularly, reel 42 is internally wired with sealed female plugs 152A and B, disposed at opposite ends of cable 146. Cable 146 preferably consists of 3-conductor wire 149, e.g., Beldon #8643 coaxial cable with PVC outer covering 30 AWG and braided shield, spliced and soldered at 148 to 4-conductor coiled wire 150, e.g., Brim #119 28 AWG. Splice 148 is preferably covered with shrink-wrapping to maintain the electrical integrity thereof. Male plug 138 of cable 136 is configured to receive female plug 152A of cable 146. Cable 146 is disposed within rail pair 66A-B which enables longitudinal movement as spool 52 rotates clockwise or counterclockwise. Rails 66 in turn move within rail pair 68A-B. There is also seen female plug 152B interconnected with male plug 142 of conductor cable 130, which as will be described in detail, interconnects with transducer sensor 200.

Figure 6:
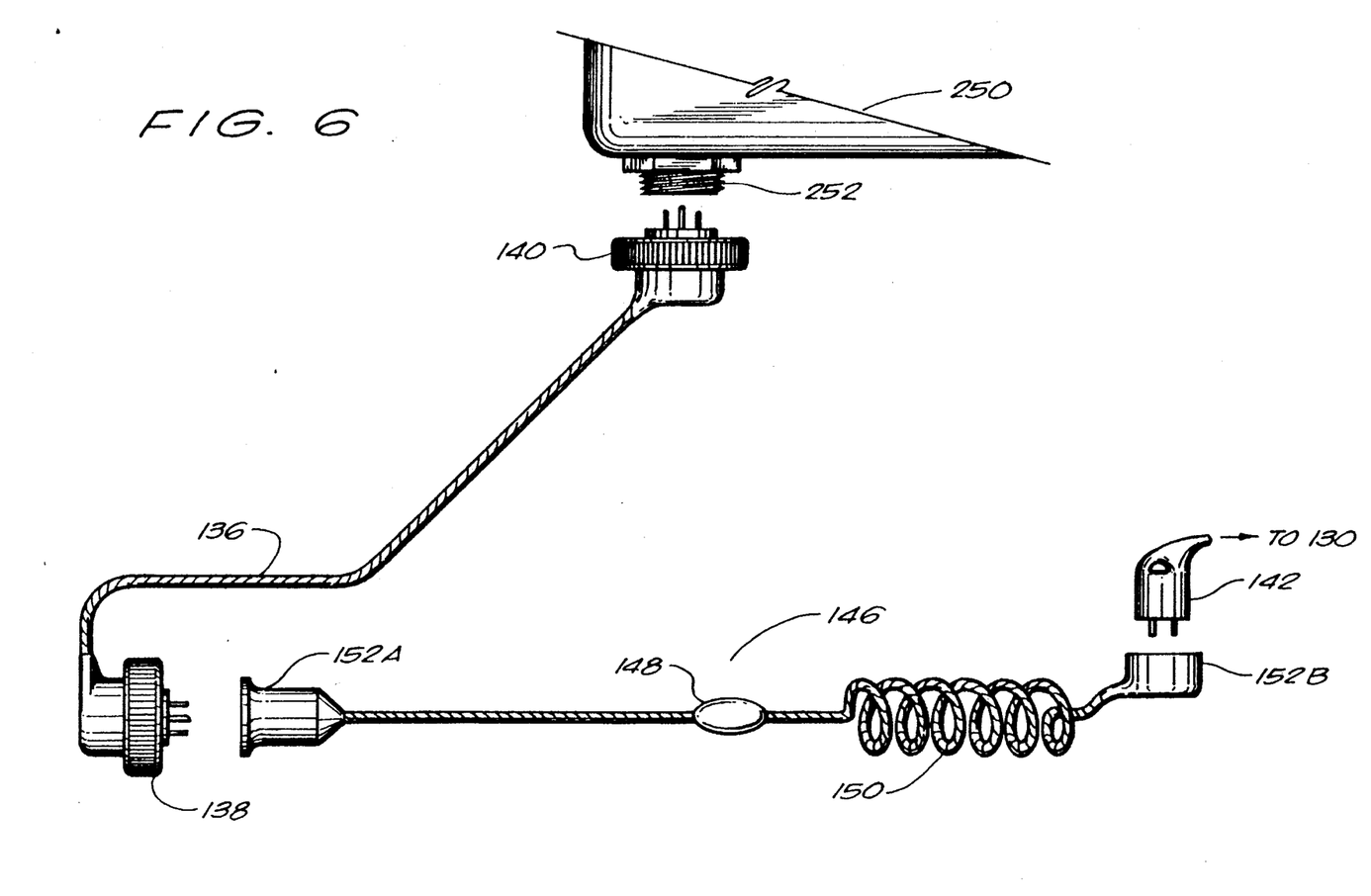
FIG. 6 is an isolated front view of the internal electrical connections within reel assembly embodying the present invention.

Now referring to FIG. 6, there is clearly shown an isolated frontal view of the internal electrical connections inside reel 42 and with display box 250 and cable 130. Female plug 152A of cable 149 is interconnected with male plug 138 of cable 138 which in turn is electrically connected with display box 250. Female plug 152B of cable 150 is interconnected with male plug 142 of cable 130 which in turn is electrically connected with sensor 200.

Figure 7A:
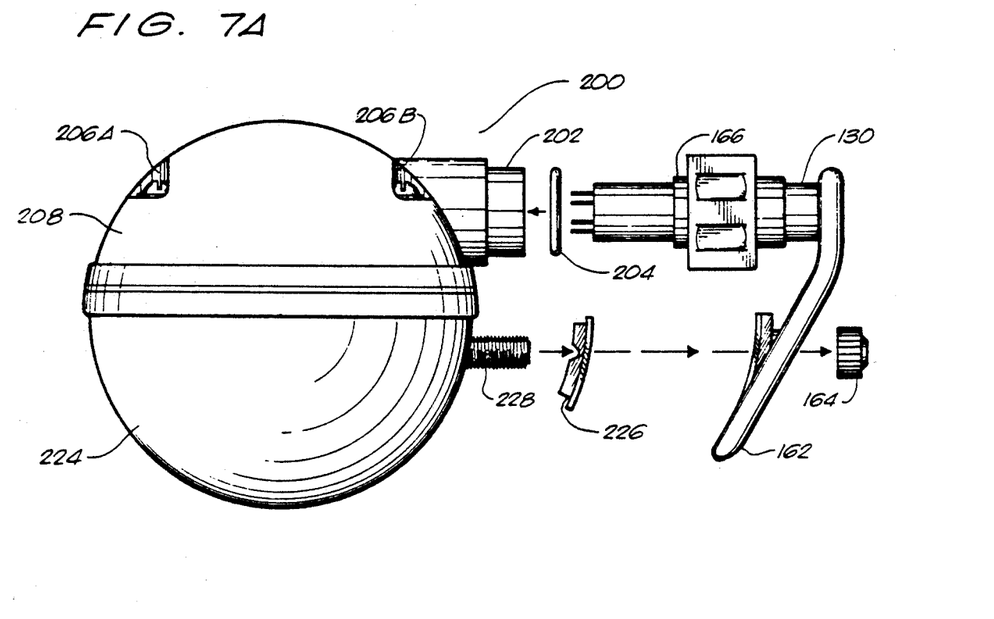
FIG. 7A is a side view of a sensor assembly embodying the present invention.
Figure 7B:
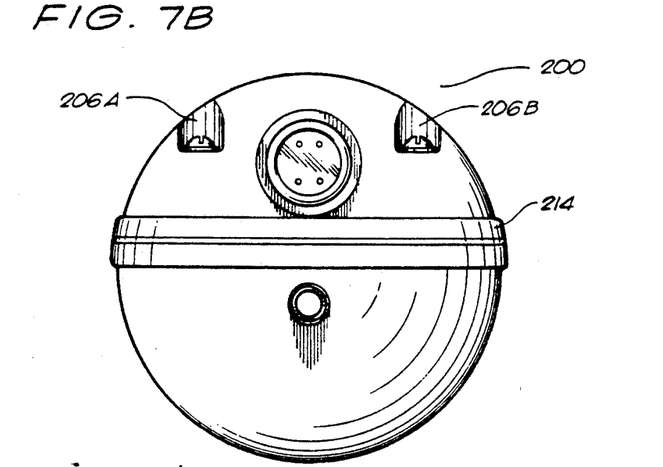
FIG. 7B is a front view of a sensor assembly depicted in FIG. 7A.

In accordance with the present invention, as is well known in the art, electrical signals may be generated in display housing 250 and transmitted along cable 130 to sensor float assembly 200. FIGS. 7A and 7B are side and front views, respectively, depicting sensor assembly 200. Four-prong female receptacle 202 receives O-ring 204 and male plug 166 of conductor cable 130. Support bracket 162 is threadedly secured to connector 228 with intervening rubber gasket 226 and retainer 164, to maintain electrical contact between sensor assembly 200 and cable 130. Top portion 208 of sensor assembly 200, preferably comprising clear plastic, is attached to its bottom portion 224, preferably comprising red plastic, by pair of bolts received by recesses 206 A-B. In accordance with the preferred embodiment of the present invention, rubber gasket 214 sustains the water-tightness of sensor assembly 200 by snugly fitting over the outside and inside of top and bottom portions, 208 and 224, respectively.

Figure 8:
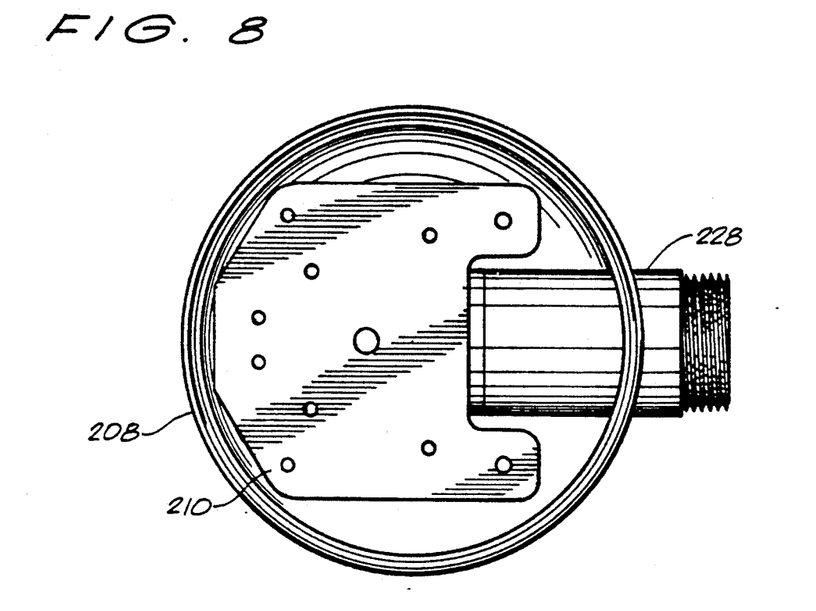
FIG. 8 is a bottom view of a portion of the sensor assembly depicted in FIGS. 7A and 7B.
Figure 9:
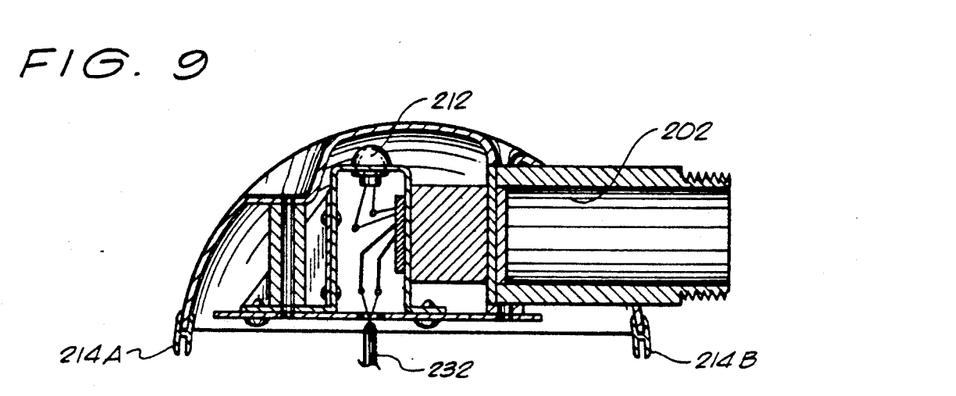
FIG. 9 is a cut-away cross sectional view of a portion of the sensor assembly depicted in FIGS. 7A and 7B.
Figure 10:
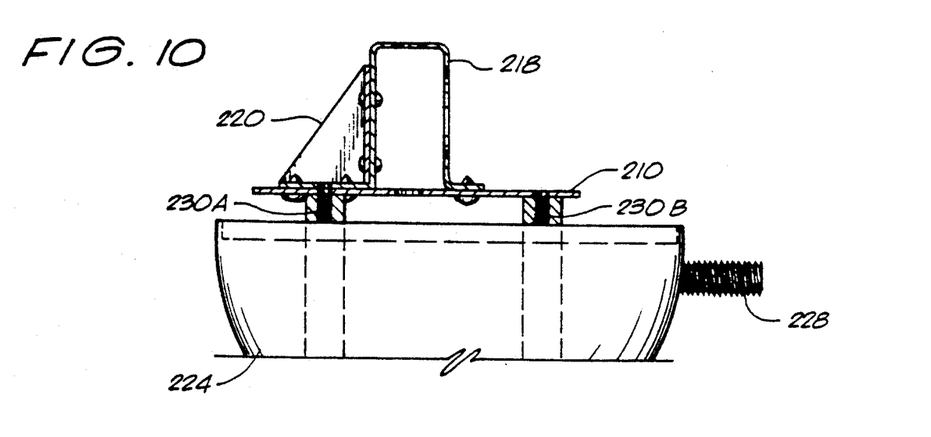
FIG. 10 is a cut-away view of a portion of the sensor assembly depicted in FIGS. 7A and 7B.
Figure 11A:
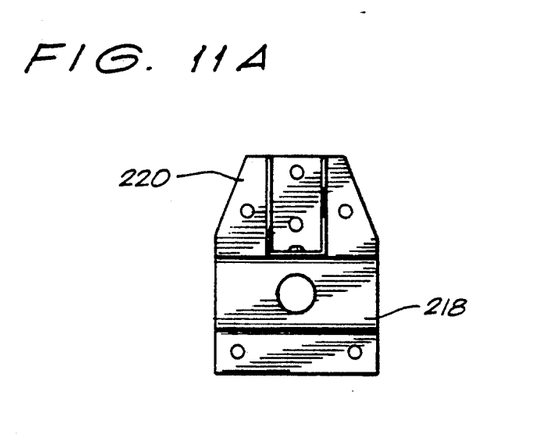
FIG. 11A is a top view of a portion of the sensor assembly depicted in FIGS. 7A and 7B.
Figure 11B:
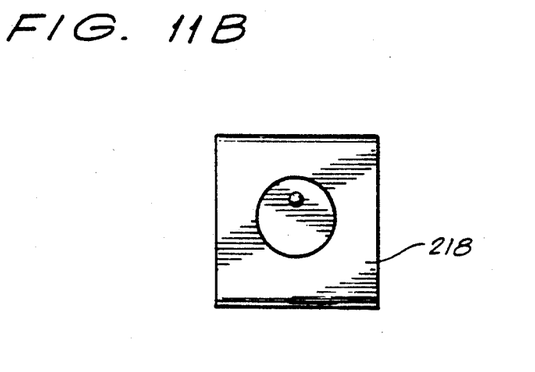
FIG. 11B is a front view of a portion of the sensor assembly depicted in FIGS. 7A and 7B.

Now referring to FIG. 8, there is seen a bottom view of preferably aluminum base plate 210 with connector 228 fixedly attached thereto. FIG. 9 depicts a cut-away view of top portion 208 of sensor assembly 200. In particular, there is shown LED 212, e.g., 2.1 volt Radio Shack #276-018 red snap-in LED. Also seen is rubber gasket 214 and transducer wire 232. Similarly, FIG. 10 shows an alternative cut-away view of top portion 208 but isolating support 220 and frame 218 structures fixedly secured to base plate 210, relative to bottom portion 224 and screwably secured thereto at 230A and B. FIGS. 11A and 11B depict top and front views of this combination support 220 and frame structure 218 which provide integrity to top portion 208 relative to transducer 234 securably contained in bottom portion 224 as will be hereinafter described.

Figure 12A:
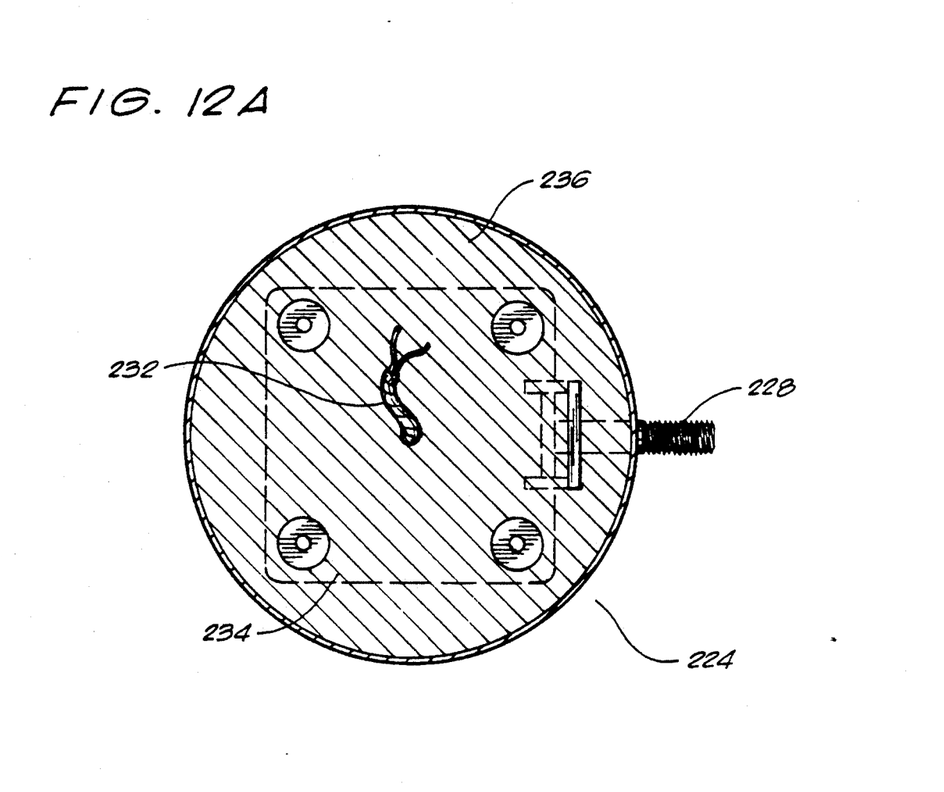
FIG. 12A is a top view of a portion of the sensor assembly depicted in FIGS. 7A and 7B.
Figure 12B:
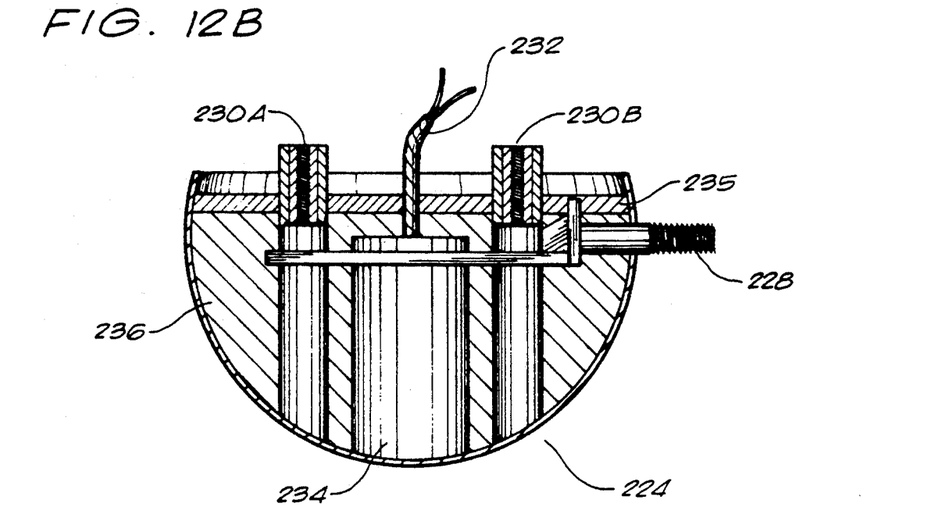
FIG. 12B is a side cut-away view of a portion of the sensor assembly depicted in FIGS. 7A and 7B.

FIGS. 12A and 12B are top and side cut-away views depicting bottom portion 224 of sensor assembly 200. Transducer 234 is snugly entrenched within foam matrix 236. In accordance with the preferred embodiment of the present invention, transducer 234 is adapted from a Techsonic Hummingbird 455 Sensor, by incorporating guide bracket and support. Firm epoxy layer 235 sealably retains transducer 234 within its foam matrix 236.

It is an important feature of the present invention that excessive water, organic impurities and debris which, of course are unavoidable environmental conditions during fishing activities, are conveniently prevented from clogging the spool and thereby interfering with the fish finder's normal operation, as is typically experienced in the prior art. Indeed, it is an advantage of the present invention that the instant fish finder may be reliably used under conditions not feasibly reached either by boat or by casting, because of exigent conditions caused by high concentration of sea weed and the like.

Figure 13:
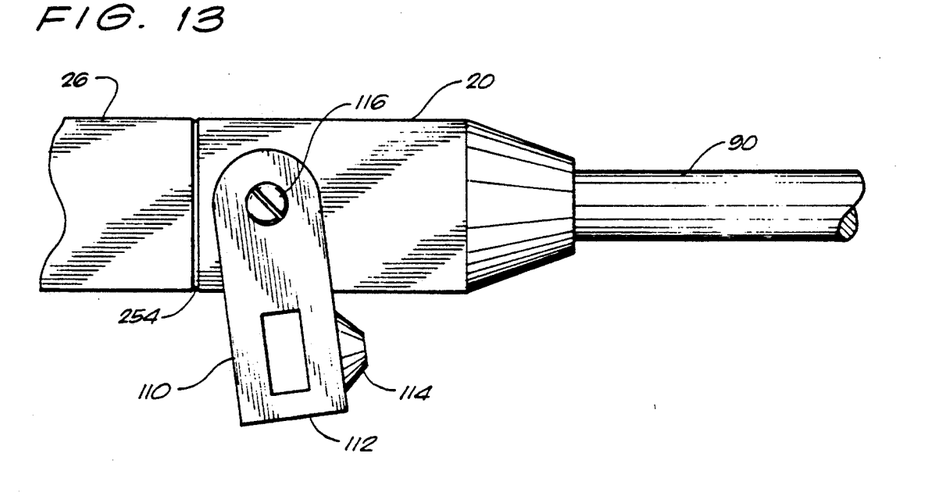
FIG. 13 is a frontal perspective view of a wiper assembly embodying the present invention.

FIGS. 13-17 depict the operation of wiper 110 in relation to the passage therethrough of conductor cable 130. Referring to FIG. 13, there is seen a frontal perspective view of wiper assembly 110 screwably held in place upon reel portion 20 and secured thereto by screw 116 which is received in threaded hole 28 (FIG. 2). Wiper holder 112 holds wiper pad 114 in place to receive conductor cable 130. with preferably cone-shaped cross-section as will be hereinafter explained. Also shown is display box bracket 26, rubber gasket 254 and rod 90. Rubber gasket 254 reduces shock to display box 250 particularly during casting and prevents water from being communicated from display bracket 26 into display box 250.

Figure 14A:
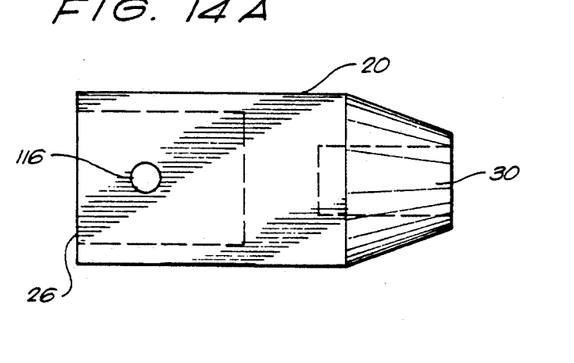
FIG. 14A is a front view of a reel portion embodying the present invention.
Figure 14B:
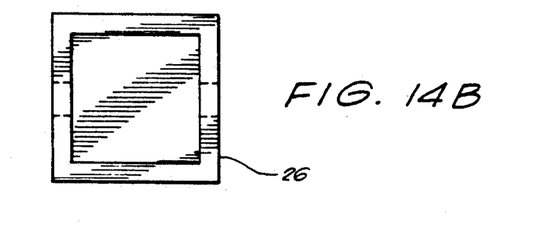
FIG. 14B is a left side view of the reel portion depicted in FIG. 14A.
Figure 14C:
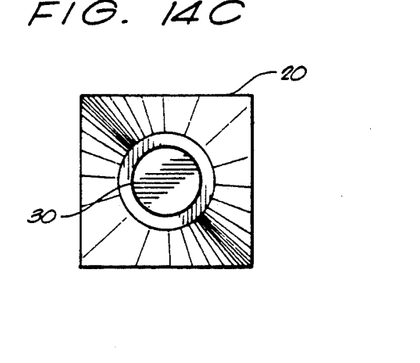
FIG. 14C is a right side view of the reel portion depicted in FIG. 14A.

FIGS. 14A, B and C are isolated front, left side and right side views, respectively, of reel portion 20. Substantially rectangular display box housing bracket 116 is shown securably attached to reel portion 20. Hole 116 in reel portion 20 receives screw 116 for releasably attaching wiper holder 112 thereto. Attachment pin 92 (FIG. 3) of rod portion 90 is configured to be snugly received in recess 30 of reel portion 20.

Figure 15:
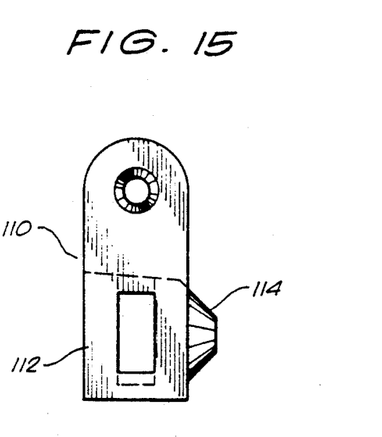
FIG. 15 is a frontal perspective view of a wiper assembly embodying the present invention.
Figure 16A:
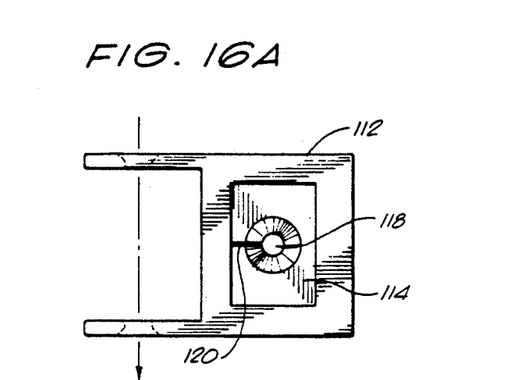
FIG. 16A is a side view of the wiper assembly depicted in FIG. 15.
Figures 16B, 17A, 17B, 18A, 18B, 18C:
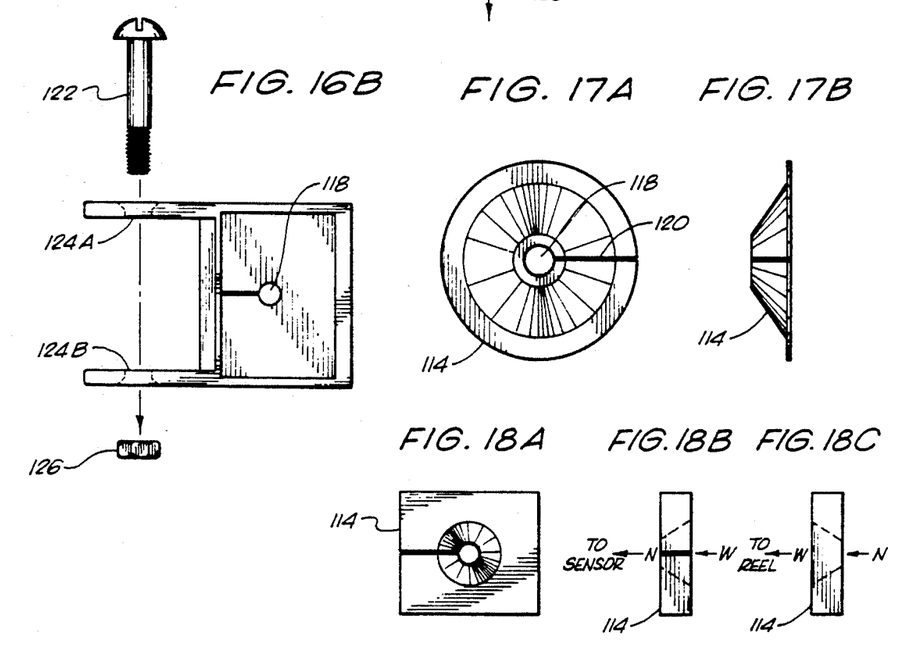
FIG. 16B is a simplified side view of the wiper assembly depicted in FIG. 15.
FIG. 17A is an enlarged frontal view of a wiper pad embodying the present invention.
FIG. 17B is a side view of the wiper pad depicted in FIG. 17A.
FIG. 18A is another frontal view of a wiper pad embodying the present invention.
FIG. 18B is a side view of the wiper pad depicted in FIG. 18A.
FIG. 18C is another side view of the wiper pad depicted in FIG. 18A.

Referring now to FIG. 15 there is seen frontal perspective view depicting wiper assembly 110 with wiper pad 114 held in advantageous position orthogonal to cable 130, by wiper holder 112. The relationship between wiper holder 112 and wiper pad 114 is more particularly shown in FIGS. 16A and 16B. Wiper holder 112 is releasably secured to assembly by bolt 122 which passes through insets 124 A-B and retained by corresponding nut 126. Cable 130 passes through hole 118 as will be hereinafter described in detail. Slit 120 in pad 114 enable the pad to be replaced when the cable is in place. FIGS. 17A and 17B depict the cross-section of wiper pad 114.

In accordance with the present invention, conical-shape wiper blade 114, which is preferably constructed from soft felt similar to the felt commonly used in chalkboard erasers, is configured to allow uninhibited casting of the combination of the conductor cable and sensor assembly 200, but to concomitantly allow water stripping and debris-stripping as the conductor cable is reeled back onto the spool. Thus, as shown in the simplified front, left and right side views of wiper pad 114 in FIGS. 18A, 18B and 18C, respectively, when casting occurs, the leading edge of the cable is received by wider cross-section W of wiper pad 114. This, of course, minimizes any inhibition or drag upon the normal casting being performed by a fisherman. On the other hand, when the cable is being reeled onto the spool, the leading edge of the cable is received by narrower cross-section N of wiper pad 114, to prevent the introduction of water and debris onto the cable coiled onto the spool.

It is thus a feature and advantage of the present invention that water and foreign materials and corrosives are prevented from passing through the wiper assembly and thereby avoids interference with the normal operation of the open-faced reel.

Figure 19:
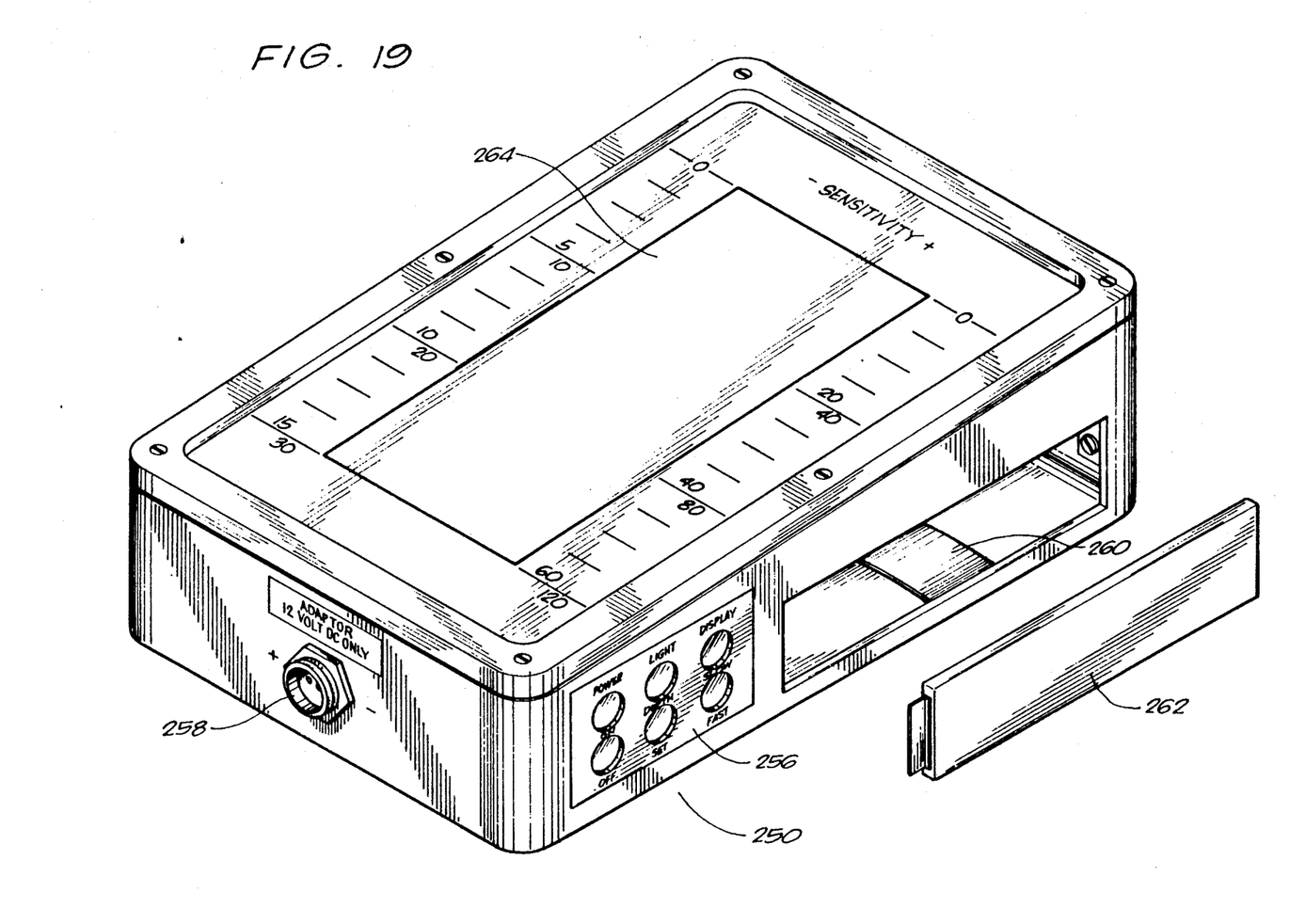
FIG. 19 is a frontal perspective view of a display box embodying the present invention.
Figure 20:
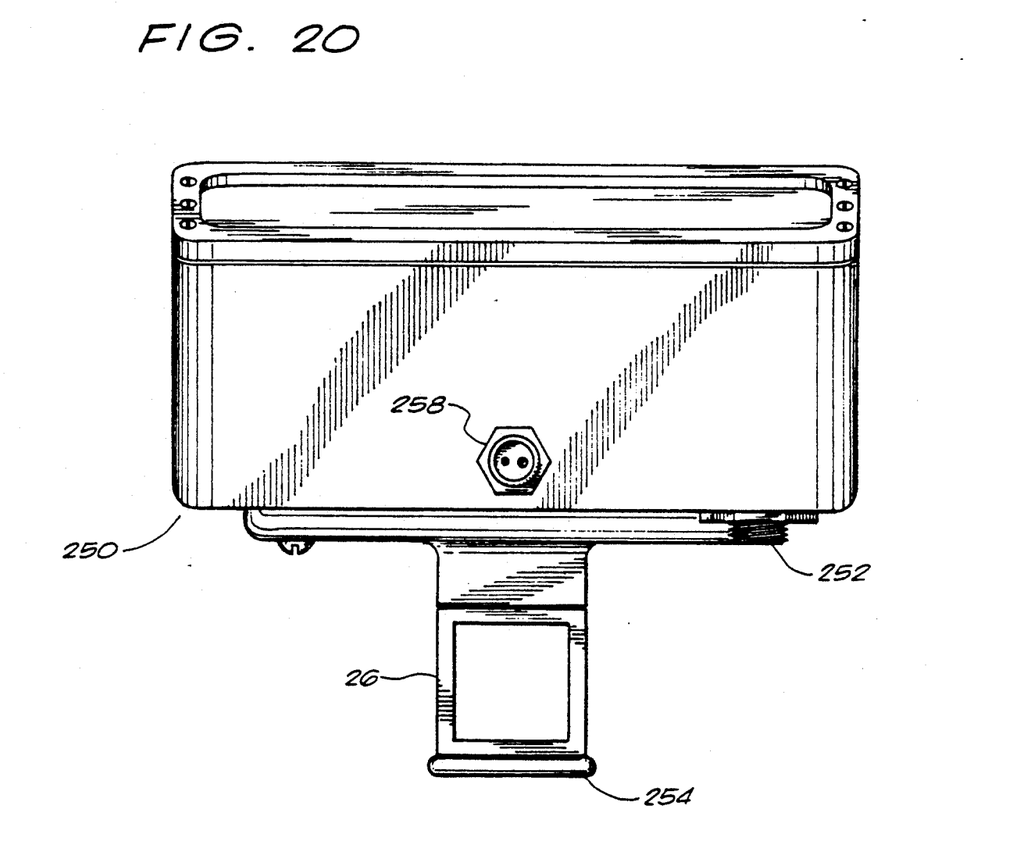
FIG. 20 is a front view of the display box depicted in FIG. 19.

Now referring to FIG. 19, there is depicted frontal perspective view of display box 250. In accordance with the present invention, power may be provided either by an internal battery or by electrically interconnecting with a car or boat battery. Shown in FIG. 19 is male plug 258 adapted to receive a car or boat battery cable. In addition there is provided compartment 260 with door 262 for receiving preferably a 12 volt battery pack, e.g., conventional 2-hour rechargeable camcorder battery pack. FIG. 20 is a front view depicting display box 250 supported by display box bracket 26 which is seated upon gasket 254, as hereinbefore described. Female plug 252 receives male plug 140 which interconnected with the rear of reel assembly 40. Preferably touch sensitive buttons and the like control the LED display in a manner well known in the art.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. A hand-held fish finder comprising:

a rod portion;

a handle portion;

a reel portion medially interconnected with said rod portion and said handle portion;

said reel portion adapted to receive display means and reel means having replaceable wiper means adapted to be releasably received by said reel portion;

said display means electrically connected with a power source and cable means;

said cable means windably received at one end thereof by said reel means after being purged of debris and excessive water by said wiper means;

said cable means when unwound from said reel means disposed longitudinally of said rod portion and another end of said cable means, opposite said one end thereof, insertably received by a remote free end of said rod portion by guide means fixedly attached to said rod portion;

sensor float means electrically connected to said other end of said cable means at said remote free end of said rod portion for transmitting a signal along said cable means to said display means;

said wiper means comprising a flexible member configured to abuttably and insertably receive said cable means through an axial hole in said wiper means; and said flexible member of said wiper means comprising:

a substantially conical cross section for enabling uninhibited axial movement of said cable means through said wiper means and toward said sensor float means and also for enabling inhibited axial movement of said cable means through said wiper means and toward said reel means, and slit means for enabling replacement of said flexible member with said cable means being disposed through said wiper means.

2. The apparatus claimed in claim 1, wherein said reel means comprises open-ended spool means.

3. The apparatus claimed in claim 2, wherein said spool means is adapted to receive said cable means by said cable means being rotated therearound while said spool means remains stationary.

4. The apparatus claimed in claim 1, wherein said sensor float means includes transducer means.

5. A hand-held fish finder comprising:

a rod portion;

a handle portion;

a reel portion medially interconnected with said rod portion and said handle portion;

said reel portion adapted to receive display means and open-ended spool means having replaceable wiper means adapted to be releasably received by said reel portion;

said display means electrically connected with a power source and cable means;

said cable means windably received at one end thereof by said reel means after being purged of debris and excessive water by said wiper means;

said cable means when unwound from said reel means disposed longitudinally of said rod portion and another end of said cable means, opposite said one end thereof, insertably received by a remote free end of said rod portion by guide means fixedly attached to said rod portion;

sensor float means electrically connected to said other end of said cable means at said remote free end of said rod portion for transmitting a signal along said cable means to said display means;

said wiper means comprising a flexible member configured to abuttably and insertably receive said cable means through an axial hole in said wiper means; and said flexible member of said wiper means comprising:

a substantially conical cross section for enabling uninhibited axial movement of said cable means through said wiper means and toward said sensor float means and also for enabling inhibited axial movement of said cable means through said wiper means and toward said reel means, and slit means for enabling replacement of said flexible member with said cable means being disposed through said wiper means.

6. The apparatus claimed in claim 5, wherein said spool means is adapted to receive said cable means by said cable means being rotated therearound while said spool means remains stationary.

7. The apparatus claimed in claim 5, wherein said sensor float means includes transducer means.

8. A hand-held fish finder comprising:

a rod portion;

a handle portion;

a reel portion medially interconnected with said rod portion and said handle portion;

said reel portion adapted to receive display means and open-ended spool means having replaceable wiper means adapted to be releasably received by said reel portion;

said spool means adapted to receive said cable means by said cable means being rotated therearound while said spool means remains stationary;

said display means electrically connected with a power source and cable means;

said cable means windably received at one end thereof by said reel means after being purged of debris and excessive water by said wiper means;

said cable means when unwound from said reel means disposed longitudinally of said rod portion and another end of said cable means, opposite said one end thereof, insertably received by a remote free end of said rod portion by guide means fixedly attached to said rod portion;

sensor float means electrically connected to said other end of said cable means at said remote free end of said rod portion for transmitting a signal along said cable means to said display means;

said wiper means comprising a flexible member configured to abuttably and insertably receive said cable means through an axial hole in said wiper means; and said flexible member of said wiper means comprising:

a substantially conical cross section for enabling uninhibited axial movement of said cable means through said wiper means and toward said sensor float means and also for enabling inhibited axial movement of said cable means through said wiper means and toward said reel means, and slit means for enabling replacement of said flexible member with said cable means being disposed through said wiper means.

9. The apparatus claimed in claim 8, wherein said sensor float means includes transducer means.

* * * * *